(12) United States Patent
Hagmann et al.

(10) Patent No.: US 7,682,532 B2
(45) Date of Patent: Mar. 23, 2010

(54) PROCESS OF DOSING A STARTING MATERIAL FOR OPTICAL LENSES

(75) Inventors: Peter Hagmann, Erlenbach am Main (DE); Axel Heinrich, Aschaffenburg (DE); Iris Leder-Bruck, Grossostheim (DE); Bernhard Seiferling, Goldbach (DE); Werner Steffan, Eichenbühl (DE)

(73) Assignee: Novartis AG, Basel (CH)

( * ) Notice: Subject to any disclaimer, the term of this patent is extended or adjusted under 35 U.S.C. 154(b) by 853 days.

(21) Appl. No.: 11/452,537

(22) Filed: Jun. 14, 2006

(65) Prior Publication Data

US 2007/0001329 A1 Jan. 4, 2007

(30) Foreign Application Priority Data

Jul. 1, 2005 (EP) .................................. 05014324

(51) Int. Cl.
*B29D 11/00* (2006.01)
(52) U.S. Cl. .................... 264/1.1; 222/526; 425/808
(58) Field of Classification Search ................. 264/1.1; 222/526; 425/808
See application file for complete search history.

(56) References Cited

U.S. PATENT DOCUMENTS 5,658,602 A 8/1997 Martin et al. ................ 425/346

FOREIGN PATENT DOCUMENTS

WO   WO 98/42497   10/1998

OTHER PUBLICATIONS

PCT International Search Report.
PCT Written Opinion of the International Searching Authority.

*Primary Examiner*—Christina Johnson
*Assistant Examiner*—Galen Hauth
(74) *Attorney, Agent, or Firm*—Robert Ambrose

(57) ABSTRACT

A process of dosing a starting material (SM) for optical lenses, into a female mold half (2), comprises the steps of:
  positioning a dosing tip (1) at a start position (P2) above the female mold half (2) and close to the edge of or laterally outside that portion (20) defining the lens-shaping surface,
  creating a continuous flow of starting material (SM) through the dosing tip (1) into the female mold half (2),
  moving the dosing tip (1) from the start position (P2) towards an end position (P3) in the region of the center of the female mold half (2) once the starting material (SM) has contacted the surface (21) of the female mold half (2) with the dosing tip (1) being in the start position (P2),
wherein the continuous flow of starting material (SM) through the dosing tip (1) and the movement of the dosing tip (1) from the start position (P2) to its end position (P3) are controlled such, that a continuous bead (B) of starting material (SM) is deposited on the surface (21) of the female mold half (2) and that the essential part of the overall volume of starting material (SM) dosed into the female mold half (2) is deposited within the female mold half (2) with the dosing tip (1) being in the end position (P3).

5 Claims, 2 Drawing Sheets

PROCESS OF DOSING A STARTING MATERIAL FOR OPTICAL LENSES

Figure 1:
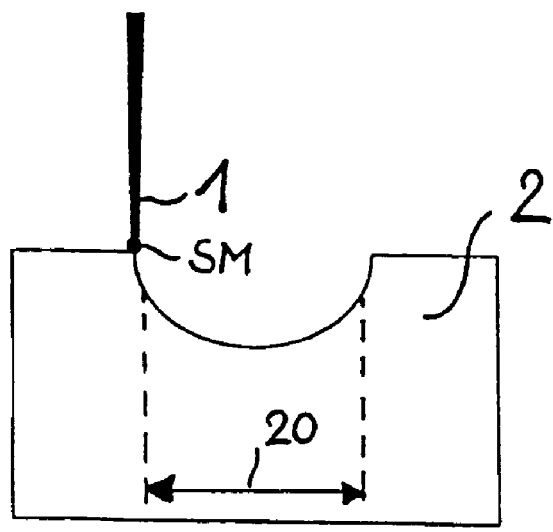

This application claims benefit under 35 USC §119 of European Application No. EP 05014324.7 filed 1 Jul. 2005, the contents of which are incorporated herein by reference.

The present invention deals with a process of dosing a starting material for optical lenses, in particular ophthalmic lenses, e.g. contact lenses, in accordance with the independent claim.

In mass production of contact lenses, such as disposable single wear contact lenses, high numbers of contact lenses must be produced in a comparatively short time. In accordance with one example for such a mass production process a starting material, e.g. an aqueous prepolymer solution, is dosed into a female mould half, the mould is then closed, and subsequently the starting material is cross-linked and/or polymerised in the lens shaping portion of the mould by exposure to UV-light. In those portions outside the lens shaping portion the starting material is shielded from exposure to UV-light. A cyclic mass production process of this type is disclosed, for example, in WO-A-98/42497.

In order for the mass production process to be effective, the time interval for dosing the above-mentioned viscous solution of reactive pre-polymer into the female mould half is only short. On the other hand, the inclusion of air bubbles in the dosed volume of starting material is practically inevitable and occurs in particular at the time when the pre-polymer solution contacts the mould surface in the presence of air.

In order to avoid inclusion of the thus generated air bubbles in the final contact lens, the prepolymer solution (starting material) is dosed in large excess with the dosing tip being arranged in a fixed dosing position close to the edge of the mould, i.e. laterally outside the lens shaping portion of the female mould half. Closing of the mould with the aid of the male mould half results in moving any air bubbles outside the lens-shaping portion of the mould. In addition, formation of air bubbles that might be generated by closing the mould with the aid of the male mould half can be avoided by moving the male mould half towards the female mould half according to a well-defined profile of movement.

This technically simple process is generally working well but suffers from the disadvantage, that the waste of starting material is comparatively high, since for the reasons outlined above the starting material has to be dosed in large excess.

Accordingly, it is an object of the instant invention to suggest a process of dosing a starting material which can be used in mass production of contact lenses and overcomes the above-mentioned disadvantages of the prior art dosing process.

According to the instant invention, this object is achieved through a process as it is characterised by the features of the independent claim. Advantageous variants of the process according to the invention are subject of the dependent claims.

In particular, the process of dosing a starting material for optical lenses, in particular ophthalmic lenses, e.g. contact lenses, into a female mould half, comprises in accordance with the instant invention the following steps of:

positioning a dosing tip at a start position above the female mould half and close to the edge of or laterally outside that portion defining the lens-shaping surface, creating a continuous flow of starting material through the dosing tip into the female mould half, moving the dosing tip from the start position towards an end position in the region of the centre of the female mould half once the starting material has contacted the surface of the female mould half with the dosing tip being in the start position, wherein the continuous flow of starting material through the dosing tip and the movement of the dosing tip from the start position to its end position are controlled such, that a continuous bead of starting material is deposited on the surface of the female mould half and that the essential part of the overall volume of starting material dosed into the female mould half is deposited within the female mould half with the dosing tip being in the end position.

The more or less inevitable air bubble that is generated at the time when the starting material is either located outside the lens shaping portion with the dosing tip being arranged in the start position or the bubble is moved laterally outside the lens shaping portion by the starting material upon closing the mould. In case the start position is located outside the lens shaping portion, the dosing tip may be located completely outside the cavity (concave portion) of the female mould or it may be located within the cavity (concave portion) but laterally outside the lens-shaping portion of the female mould half. Since there is a continuous flow of starting material through the dosing tip, and since the dosing tip is moved towards the end position in the region of the centre of the female mould half once the starting material has contacted the surface of the female mould half in a manner such that a continuous bead of starting material is deposited on the surface of the female mould half, additional air bubbles are not generated during the dosing step. In addition, since the essential part of the overall volume of starting material is deposited within the female mould half with the dosing tip being in its end position, a large excess of starting material can be avoided, thus keeping the process technically simple but increasing its efficiency.

In a preferred variant of the process according to the invention the percentage of the volume of starting material dosed into the female mould half with the tip being in the end position is higher than 50%, more preferably higher than 60%, and most preferably higher than 75%. This ensures only little waste of starting material.

In a further variant of the process according to the invention the start position of the dosing tip is located above the concave surface of the female mould half outside the lens-shaping portion. This simplifies controlling the movement of the dosing tip.

In one further variant of the process according to the invention the flow of starting material through the dosing tip is constant and the movement of the dosing tip from the start position to the end position is controlled such that a continuous bead or film of starting material is deposited on the surface of the female mould half. Also, the movement is controlled such that the essential part of the overall volume of starting material dosed into the female mould half is dosed into the female mould half with the dosing tip being in the end position. In this variant it is only necessary to control the movement of the dosing tip, since the flow of starting material is constant.

However, in accordance with another variant of the process according to the invention the flow of starting material through the dosing tip is varying and the movement of the dosing tip from its start position to its end position is adapted to the varying flow of starting material through the dosing tip (or the other way round: the flow of starting material is adapted to the movement of the dosing tip) such that a continuous bead of starting material is deposited on the surface of the female mould half. Also in this variant, the essential part of the overall volume of starting material is dosed into the female mould half is dosed into the female mould half with the dosing tip being in the end position.

In still a further variant of the process according to the invention the flow of starting material through the dosing tip and the movement of the dosing tip from its start position towards its end position are controlled such that only a thin but continuous bead of starting material is deposited on the surface of the female mould half until the dosing tip has reached the end position. This minimizes waste of starting material, and at the same time prevents generation of bubbles by the dosing step (except for the initial dosing bubble, which is created laterally outside the lens shaping portion of the female mould half).

Figure 2:
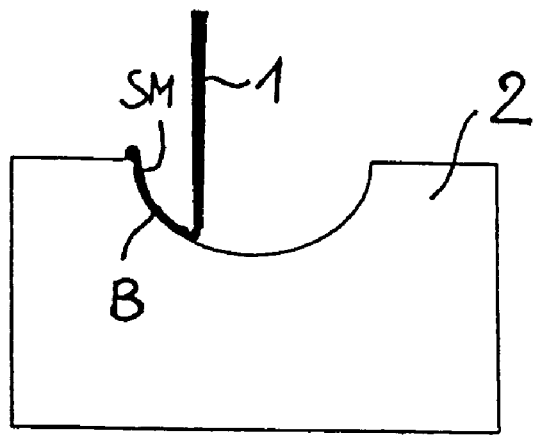
Figure 3:
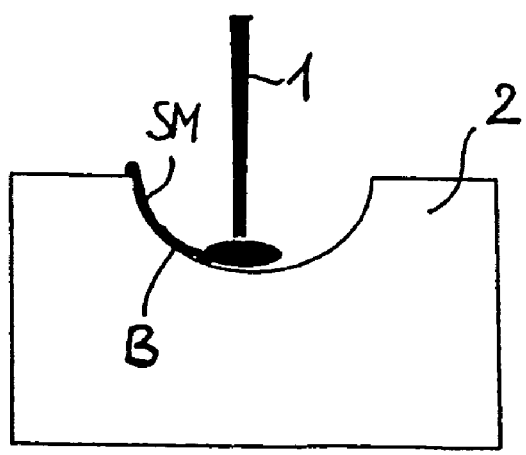
Figure 4:
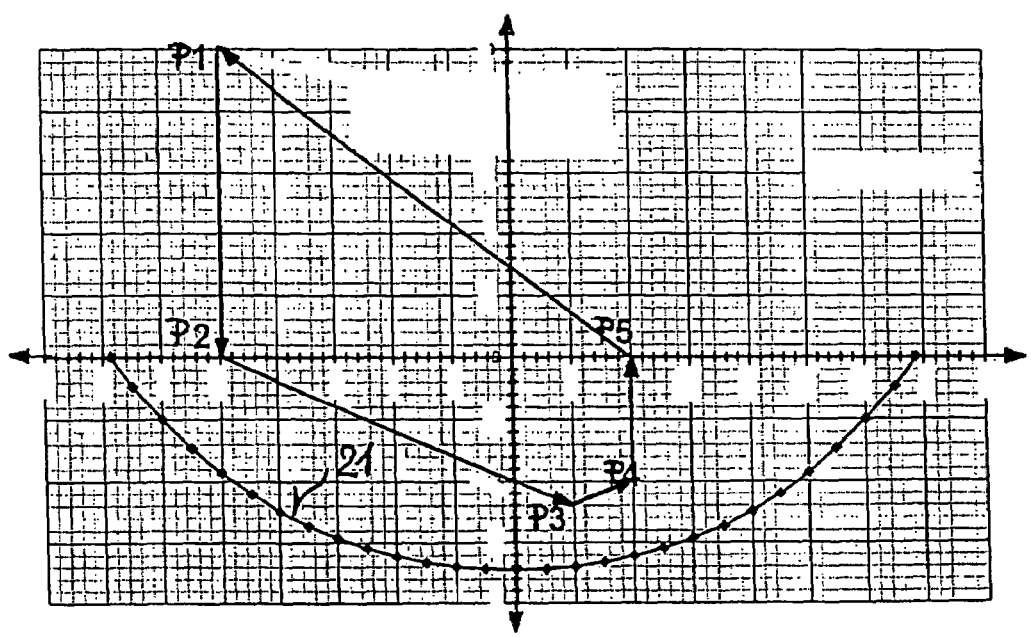

Further advantageous aspects of the process according to the invention will become apparent from the following detailed description of variants of the process with the aid of the drawings, in which:

FIG. 1-3 show schematically three essential steps of a first variant of the process according to the invention, and FIG. 4 shows schematically a second variant of the process according to the invention.

Referring to the schematic representations of FIG. 1, FIG. 2 and FIG. 3, a first variant of the process according to the invention will now be explained in more detail. In FIG. 1, there are shown a dosing tip 1, a female mould half 2 having a lens shaping portion 20, and a droplet of a starting material SM (e.g. an aqueous pre-polymer) flowing out of dosing tip 1. In FIG. 1, dosing tip 1 is in its start position laterally outside lens shaping portion 20 of female mould half 2. A dosing bubble (not shown) typically occurring at the time the starting material SM contacts the surface of female mould half 2 is therefore located laterally outside lens shaping portion 20 of female mould half 2. A continuous flow of starting material through dosing tip 1 is generated, and once the starting material SM has contacted the surface of female mould half 2, dosing tip 1 is moved from its start position shown in FIG. 1 towards an end position located in the region of the centre of female mould half 2, thereby depositing a continuous bead B of starting material SM on the surface of female mould half 2 (see FIG. 2). Care must be taken that the bead B is not interrupted during the movement of dosing tip 1 towards its end position. This can be achieved by controlling the flow of starting material through dosing tip 1 and/or by controlling the movement of dosing tip 1 towards its end position, as this will be explained in more detail further below. It is preferred, that only a thin but continuous bead of starting material is deposited on the surface of female mould half 2 until dosing tip 1 has reached its end position.

As mentioned, dosing tip 1 is moved from its start position towards its end position that is located above the centre of female mould half 2 in the shown first variant of the process. In the end position (see FIG. 3), the essential part of the overall volume of starting material SM dosed into female mould half 2 is deposited within female mould half 2. The percentage of the volume of starting material SM that is dosed into the female mould half with the dosing tip being in the end position can be higher than 50%, more preferably higher than 60%, and most preferably higher than 75%, so as to substantially reduce the waste of starting material SM.

In order to form a lens (e.g. a contact lens), the mould is then closed with the aid of a male mould half (not shown) following a well-defined profile of movement so as to avoid generation of additional bubbles through the closing of the mould. By closing the mould with the aid of a male mould half, the starting material deposited in the centre of female mould half 2 is squeezed outwardly thus keeping a bubble, that has typically been generated at the time the starting material has contacted female mould half 2, outside the lens shaping portion of the mould. After closing of the mould has been completed, the starting material (e.g. the aqueous pre-polymer) can be cross-linked and/or polymerised in the lens shaping region of the mould in a manner known in the art.

FIG. 4 shows a further variant of the process according to the invention. In FIG. 4, a complete cycle of movement of the dosing tip 1 (not shown in FIG. 4) is represented, in which well-defined positions have been marked and will be explained below. The cycle of movement starts at reference position P1, from which dosing tip 1 (not shown in FIG. 4) is lowered to reach start position P2. It can be seen, that start position P2 is located within the concave portion of the female mould half but outside the lens-shaping portion. At start position P2, the dosing of starting material is commenced. During the dosing process (as has already been described with respect to FIG. 1), dosing tip 1 is moved towards a region in the centre of the female mould half until it reaches end position P3, in which the essential part of the volume of starting material is deposited into the female mould half, only the concave surface 21 of which is shown in FIG. 4. In the second variant of the process shown in FIG. 4, the end position P3 of the dosing tip is located slightly off-centre, but in the region of the centre. At the time the overall volume of volume has been dosed into female mould half, dosing tip 1 is moved towards position P4 and is then lifted upwardly towards position P5, whereupon dosing tip 1 is returned to reference position P1.

As to the controlling of the flow of starting material through dosing tip 1 and the related controlling of the movement of dosing tip 1, several ways are possible. According to a first option, it is possible to keep the flow rate of starting material through dosing tip 1 constant and to control the deposition of starting material within female mould half 2 by controlling the movement of dosing tip 1 on its way from the start position P2 to the end position P3 such, that a continuous bead, preferably only a thin but continuous bead, of starting material is deposited within female mould half. According to a second option, both the flow rate through the dosing tip can be controlled (e.g. by a suitable controllable pump) and may vary, while the movement of dosing tip 1 can be controlled, too, so that again a continuous bead, preferably only a thin but continuous bead, of starting material is deposited within female mould half. That is to say, the movement of dosing tip 1 can be adapted in both cases to the flow rate of starting material flowing through dosing tip 1 so as to achieve the desired result, i.e. deposition of a continuous bead of starting material being deposited on female mould half during movement of dosing tip I from start position P2 towards end position P3 and deposition of the essential part of the overall volume of starting material SM within female mould half with dosing tip 1 being in end position P3. Thus, the excess of starting material dosed into female mould half can be significantly reduced.

The invention claimed is:

1. Process of dosing a starting material for optical lenses into a female mould half having a concave surface, the process comprising the steps of:
   positioning a dosing tip at a start position above the female mould half and close to the edge of or laterally outside that portion (20) defining the lens-shaping surface,
   creating a continuous flow of starting material through the dosing tip into the female mould half,
   moving the dosing tip from the start position towards an end position in the region of the centre of the female mould half once the starting material has contacted the surface of the female mould half with the dosing tip being in the start position, wherein the continuous flow of starting material through the dosing tip and the movement of the dosing tip from the start position to its end position are controlled such, that a continuous bead of starting material is deposited on the surface of the female mould half and higher than 50% of the overall volume of starting material dosed into the female mould half is deposited within the female mould half with the dosing tip being in the end position.

2. Process according to claim 1, wherein the start position of the dosing tip is located above the concave surface of the female mould half laterally outside the lens-shaping portion.

3. Process according to claim 1, wherein the flow of starting material through the dosing tip is constant and the movement of the dosing tip from the start position to the end position is controlled such that a continuous bead or film of starting material is deposited on the surface of the female mould half.

4. Process according to claim 1, wherein the flow of starting material through the dosing tip is varying and the movement of the dosing tip from its start position to its end position is adapted to the varying flow of starting material through the dosing tip such that a continuous bead of starting material is deposited on the surface of the female mould half.

5. Process according to any one of the preceding claims, wherein the flow of starting material through the dosing tip and the movement of the dosing tip from its start position towards its end position are controlled such that only a thin but continuous film of starting material is deposited on the surface of the female mould half until the dosing tip has reached the end position.

* * * * *